United States Patent
Yamaguchi

(10) Patent No.: US 9,200,676 B2
(45) Date of Patent: Dec. 1, 2015

(54) FITTING STRUCTURE OF CYLINDRICAL MEMBER

(71) Applicant: DaikyoNishikawa Corporation, Hiroshima (JP)

(72) Inventor: Tsuyoshi Yamaguchi, Hiroshima (JP)

(73) Assignee: DaikyoNishikawa Corporation, Hiroshima (JP)

( * ) Notice: Subject to any disclaimer, the term of this patent is extended or adjusted under 35 U.S.C. 154(b) by 0 days.

(21) Appl. No.: 14/488,578

(22) Filed: Sep. 17, 2014

(65) Prior Publication Data

US 2015/0003901 A1    Jan. 1, 2015

Related U.S. Application Data

(63) Continuation of application No. PCT/JP2013/001662, filed on Mar. 13, 2013.

(30) Foreign Application Priority Data

Mar. 21, 2012 (JP) ................... 2012-063692

(51) Int. Cl.
| | |
|---|---|
| *F16D 1/033* | (2006.01) |
| *B62D 1/20* | (2006.01) |
| *B62D 1/16* | (2006.01) |
| *B62D 3/02* | (2006.01) |

(52) U.S. Cl.
CPC *F16D 1/033* (2013.01); *B62D 1/16* (2013.01); *B62D 1/20* (2013.01); *B62D 3/02* (2013.01); *Y10T 403/52* (2015.01)

(58) Field of Classification Search
USPC ........... 403/288; 277/609, 616; 285/307, 319, 285/921

See application file for complete search history.

(56) References Cited

U.S. PATENT DOCUMENTS

| | | | | |
|---|---|---|---|---|
| 3,367,682 | A | * | 2/1968 | Meriano ................. 285/106 |
| 5,145,219 | A | * | 9/1992 | Babuder ................. 285/330 |
| 5,340,170 | A | * | 8/1994 | Shinohara et al. ............ 285/379 |
| 5,366,261 | A | * | 11/1994 | Ohmi et al. ................. 285/328 |
| 5,409,270 | A | * | 4/1995 | Shinohara et al. ............ 285/379 |
| 5,826,918 | A | * | 10/1998 | Bowles et al. ................. 285/24 |
| 8,556,023 | B2 | * | 10/2013 | Shimizu et al. ............ 180/444 |
| 2004/0256849 | A1 | | 12/2004 | Suzuki et al. |
| 2009/0001673 | A1 | * | 1/2009 | Braun et al. ................. 277/628 |
| 2015/0003901 | A1 | * | 1/2015 | Yamaguchi ................. 403/288 |

FOREIGN PATENT DOCUMENTS

| | | |
|---|---|---|
| JP | S63-131867 U | 8/1988 |
| JP | H10-250602 A | 9/1998 |

(Continued)

OTHER PUBLICATIONS

International Search Report; PCT/JP2013/001662; Apr. 9, 2013.

*Primary Examiner* — Victor MacArthur
(74) *Attorney, Agent, or Firm* — Studebaker & Brackett PC

(57) ABSTRACT

A recess is formed in an outer circumferential surface of a first fitting cylinder. A flange and a second fitting cylinder are provided at one end of a second cylindrical member which is part of a dust cover. A sealing member is attached to the flange. A protruding portion is provided on an inner circumferential surface of the second fitting cylinder. The sealing member is strongly pressed by the first fitting cylinder and the flange in the state where the first fitting cylinder is fitted into the second fitting cylinder, and where the recess and the protruding portion are fitted to each other. Due to this structure, up-and-down movement of the both fitting cylinders is limited, and the sealing member is strongly pressed, thereby maintaining sealing.

6 Claims, 9 Drawing Sheets

(56) References Cited

FOREIGN PATENT DOCUMENTS

| | | |
|---|---|---|
| JP | H11-078912 A | 3/1999 |
| JP | 2004-322788 A | 11/2004 |
| JP | 2005-313798 A | 11/2005 |
| JP | 2006-001504 A | 1/2006 |

* cited by examiner

FITTING STRUCTURE OF CYLINDRICAL MEMBER

CROSS-REFERENCE TO RELATED APPLICATIONS

This is a continuation of International Application No. PCT/JP2013/001662 filed on Mar. 13, 2013, which claims priority to Japanese Patent Application No. 2012-063692 filed on Mar. 21, 2012. The entire disclosures of these applications are incorporated by reference herein.

BACKGROUND

The present disclosure relates to fitting structures of a pair of cylindrical members which are fitted to each other at their respective ends with a sealing member interposed therebetween, and for example, relates to fitting structures of cylindrical members used to fit a shaft accommodating part, which is part of a vehicle's steering gear box and in which a steering shaft is inserted and accommodated, into one end of a dust cover for preventing dust from coming into the steering gear box.

In general, a vehicle includes, at a front side thereof, a dash panel which separates an engine compartment and a cabin from each other, a steering shaft which passes through an opening formed in the dash panel, a steering wheel provided at the cabin and coupled to the upper end of the steering shaft, and a steering gear box provided at the engine compartment and drive-coupled to the lower end of the steering shaft. Japanese Unexamined Patent Publication No. 10-250602 (page 3, FIG.5) discloses a column hole cover structure in which a cylindrical bush that slide-contacts with an outer circumferential surface of a steering shaft is inserted in a rubber-made column hole cover attached to a periphery of the opening in the dash panel from the cabin side. The column hole cover structure prevents water or the like from entering from the steering gear box to the cabin or from the cabin to the steering gear box.

The steering gear box includes a cylindrical shaft accommodating part which is part of the steering gear box and in which a lower end portion of the steering shaft is inserted and accommodated. In some cases, a dust cover which prevents entry of dust into the steering gear box may be attached to the shaft accommodating part. Specifically, the shaft accommodating part includes, at one end thereof, a first fitting cylinder that is fitted into the dust cover, and a recess is formed in the entire outer circumferential surface of the first fitting cylinder. On the other hand, the dust cover includes an annular flange which protrudes from one end of the dust cover in a direction orthogonal to the cylinder's center line, and a second fitting cylinder which is provided at the entire protrusion edge of the flange and projects in the cylinder's center line direction from the protrusion edge, and into which the first fitting cylinder is inserted. The first fitting cylinder is press-fitted in the second fitting cylinder, with an annular double-sided tape adhered to the flange, and an O ring fitted in the recess, wherein the double-sided tape is strongly pressed by the end of the first fitting cylinder and the flange.

SUMMARY

However, in the above-described fitting structure, the first fitting cylinder and the second fitting cylinder are fitted to each other by the first fitting cylinder and the second fitting cylinder strongly pressing the O ring radially outward and radially inward, but nothing is provided to limit the movement of the first fitting cylinder and the second fitting cylinder in the cylinder's center line direction. Thus, when the steering gear box and the dust cover fitted to each other are oscillated, the second fitting cylinder may be gradually misaligned with respect to the first fitting cylinder in the cylinder's center line direction, and the dust cover may be detached from the steering gear box in the end. Further, it takes time and effort to adhere an annular double-sided tape to the flange and fit the O ring in the recess. Also, in the column hole cover structure shown in Japanese Unexamined Patent Publication No. 10-250602, the column hole cover is made of rubber, which makes it difficult to fix the location of the column hole cover and therefore difficult to insert the cylindrical bush in the column hole cover.

The present disclosure is thus intended to prevent cylindrical members from being detached from each other due to oscillation or the like, while maintaining sealing, and to provide a fitting structure of the cylindrical members which requires less time and effort in fitting one of the cylindrical members to the other.

To achieve the above objective, structures of the first fitting cylinder and the second fitting cylinder and a location of the sealing member are improved in the present disclosure.

Specifically, the present disclosure is directed to a fitting structure of cylindrical members, including: a first cylindrical member (21) having a first fitting cylinder (25) at one end thereof; a second cylindrical member (31, 73, 97, 119) having, at one end thereof, an annular flange (39, 81, 107, 129) which protrudes in a direction intersecting a cylinder's center line, and a second fitting cylinder (41, 77, 101, 123) which projects from an entire protrusion end of the flange (39, 81, 107, 129) in a direction of the cylinder's center line and into which the first fitting cylinder (25) is fitted; and a sealing member (55, 63, 75, 99, 121) accommodated in the second fitting cylinder (41, 77, 101, 123) and placed on the flange (39, 81, 107, 129), the sealing member (55, 63, 75, 99, 121) being strongly pressed by an end of the first fitting cylinder (25) and the flange (39, 81, 107, 129) in a state where the first fitting cylinder (25) is fitted in the second fitting cylinder (41, 77, 101, 123). The present disclosure provides the following solutions.

The first aspect of the present disclosure is that at least two engaging portions (43, 79, 103, 125) are formed on one of the first fitting cylinder (25) or the second fitting cylinder (41, 77, 101, 123), and an engaged portion (27) with which the engaging portions (43, 79, 103, 125) engage is formed in the other, and each of the engaging portions (43, 79, 103, 125) engages with the engaged portion (27) in the state where the first fitting cylinder (25) is fitted in the second fitting cylinder (41, 77, 101, 123), thereby limiting movement of the first fitting cylinder (25) and the second fitting cylinder (41, 77, 101, 123) in the direction of the cylinder's center line, and maintaining the state where the sealing member (55, 63, 75, 99, 121) is strongly pressed by the end of the first fitting cylinder (25) and the flange (39, 81, 107, 129).

The second aspect of the present disclosure is that in the first aspect of the present disclosure, the engaging portions (43) are protruding portions (43) which protrude from an inner circumferential surface (41a) of the second fitting cylinder (41), the engaged portion (27) is a recess (27) which corresponds to the protruding portions (43) and is formed in an outer circumferential surface (25a) of the first fitting cylinder (25), the second fitting cylinder (41) is provided with a through hole (45) that is located between each of the protruding portions (43) and the flange (39) and penetrates the second fitting cylinder (41) in the direction intersecting the cylinder's center line, a periphery of the through hole (45) is continuous with a surface of a corresponding one of the protruding portions (43) facing the flange (43a) and a sealing member placement surface (39a) of the flange (39) without a step, the sealing member (55) includes a fixing portion (59) extending outward from an outer periphery of the sealing member (55), and when the sealing member (55) is placed on the flange (39), the fixing portion (59) is inserted in the through hole (45) and is engaged with an outer periphery of the flange (39).

The third aspect of the present disclosure is that in the first or second aspect of the present disclosure, the second fitting cylinder (41) is provided with a notch (47) obtained by cutting out a portion of the second fitting cylinder (41) entirely in a projection direction of the second fitting cylinder (41), a claw (49) is provided to protrude from at least one of opposing side surfaces of the notch (47), the sealing member (63) includes an extended portion (69) extending outward from an outer periphery of the sealing member (63), and the extended portion (69) is pressed onto the sealing member placement surface (39a) of the flange (39) by the claws (49).

The fourth aspect of the present disclosure is that in the first aspect of the present disclosure, the sealing member (99) includes a projection (117) extending outward from an outer periphery of the sealing member (99), and the second fitting cylinder (101) is provided with an accommodation recess (105) which is open on an inner circumferential surface (101a) of the second fitting cylinder (101) and in which the projection (117) is to be accommodated.

The fifth aspect of the present disclosure is that in the first aspect of the present disclosure, the second fitting cylinder (123) is provided with a raised portion (127) which protrudes from an inner circumferential surface (123a) of the second fitting cylinder (123), and an outer periphery of the sealing member (121) is pressed onto a sealing member placement surface (129a) of the flange (129) by the raised portion (127).

The sixth aspect of the present disclosure is that in any one of the first to fifth aspects of the present disclosure, the first cylindrical member (21) is part of a steering gear box (1) of a vehicle (5), the second cylindrical member (31, 73, 97, 119) is part of a dust cover (3) disposed in a dash panel (7) which separates an engine compartment (9) and a cabin (11) from each other, and a steering shaft (15) is inserted in the first cylindrical member (21) and the second cylindrical member (31, 73, 97, 119).

According to the first aspect of the present disclosure, at least two engaging portions are formed on one of the first fitting cylinder or the second fitting cylinder, and an engaged portion with which the engaging portions engage is formed in the other. Each of the engaging portions engages with the engaged portion in the state where the first fitting cylinder is fitted in the second fitting cylinder, thereby limiting movement of the first fitting cylinder and the second fitting cylinder in the direction of the cylinder's center line. Thus, it is possible to prevent one of the cylindrical members from being detached from the other even when the cylindrical members fitted to each other are oscillated. Further, the sealing member is strongly pressed by the end of the first fitting cylinder and the flange in the state where the cylindrical members are engaged with each other. Thus, sufficient sealing can be ensured. Furthermore, fitting the cylindrical members to each other does not require time and effort because the fitting cylinders can be fitted to each other by simply fitting the first fitting cylinder into the second fitting cylinder, with the sealing member attached to the flange of the second cylindrical member.

According to the second aspect of the present disclosure, due to the protruding portions which protrude from the inner circumferential surface of the second fitting cylinder, the flange and the second fitting cylinder form an undercut. Thus, in the case where the second cylindrical member is made of resin, the molding dies need to include a slide die for molding the protruding portions. In the case where the second fitting cylinder has a relatively small diameter, the slide die needs to be slid at a location outside the second fitting cylinder. In this case, the through hole is inevitably formed by the slide die between the flange and the protruding portion. The fixing portions are thus provided at the outer periphery of the sealing member, and the fixing portions are inserted in the through holes to be engaged with the outer periphery of the flange. As a result, the sealing member placed on the sealing member placement surface is prevented from falling off the second cylindrical member.

According to the third aspect of the present disclosure, the sealing member is attached onto the sealing member placement surface of the flange by simply inserting the extended portion of the sealing member from an open end of the notch and pushing the extended portion toward the flange. Thus, the sealing member is easily attached. Further, since the extended portion is pushed against the sealing member placement surface of the flange by the claws, movement of the extended portion toward the open end of the notch is limited. It is therefore possible to prevent the placed sealing member from falling off the second cylindrical member.

Further, according to the third aspect of the present disclosure, the second fitting cylinder needs to be opened to some extent so that the first fitting cylinder can be fitted into the second fitting cylinder. The notch formed in the second fitting cylinder allows the second fitting cylinder to be easily opened, which leads to easier fitting process. Particularly when the second fitting cylinder has a relatively small diameter and is not easily opened, the notch helps the second fitting cylinder to be easily opened. This means that the notch is effective particularly in the case where the second fitting cylinder has a relatively small diameter.

According to the fifth aspect of the present disclosure, the projection extending radially outward from the outer periphery of the sealing member is accommodated in the accommodation recess formed in the second fitting cylinder. The projection comes in contact with the end faces of the accommodation recess in the cylinder's center line direction, thereby limiting movement of the sealing member in the cylinder's center line direction. It is therefore possible to prevent the placed sealing member from falling off the second cylindrical member.

According to the sixth aspect of the present disclosure, the outer periphery of the sealing member is pressed onto the sealing member placement surface of the flange by the raised portion provided at the second fitting cylinder. The movement of the sealing member in the cylinder's center line direction is therefore limited. It is thus possible to prevent the sealing member from falling off the second cylindrical member. This means that nothing needs to be provided at the outer periphery of the sealing member, and the structure of the sealing member can be therefore simplified.

According to the seventh aspect of the present disclosure, application of the fitting structure of cylindrical members of the present disclosure to a fitting structure of a steering gear box and a dust cover can prevent the dust cover from falling off the steering gear box due to oscillation, while ensuring sealing of the portion where the steering gear box and the dust cover are fitted to each other.

DETAILED DESCRIPTION

Embodiments of the present disclosure will be described in detail below based on the drawings. The following embodiments are merely preferred examples in nature, and are not intended to limit the scope, applications, and use of the invention. In the embodiments below, a case in which a fitting structure of cylindrical members of the present disclosure is applied to a fitting structure of a vehicle's steering gear box and a dust cover which prevents water and dust, etc., from entering the steering gear box will be described.

(First Embodiment)

Figure 1:
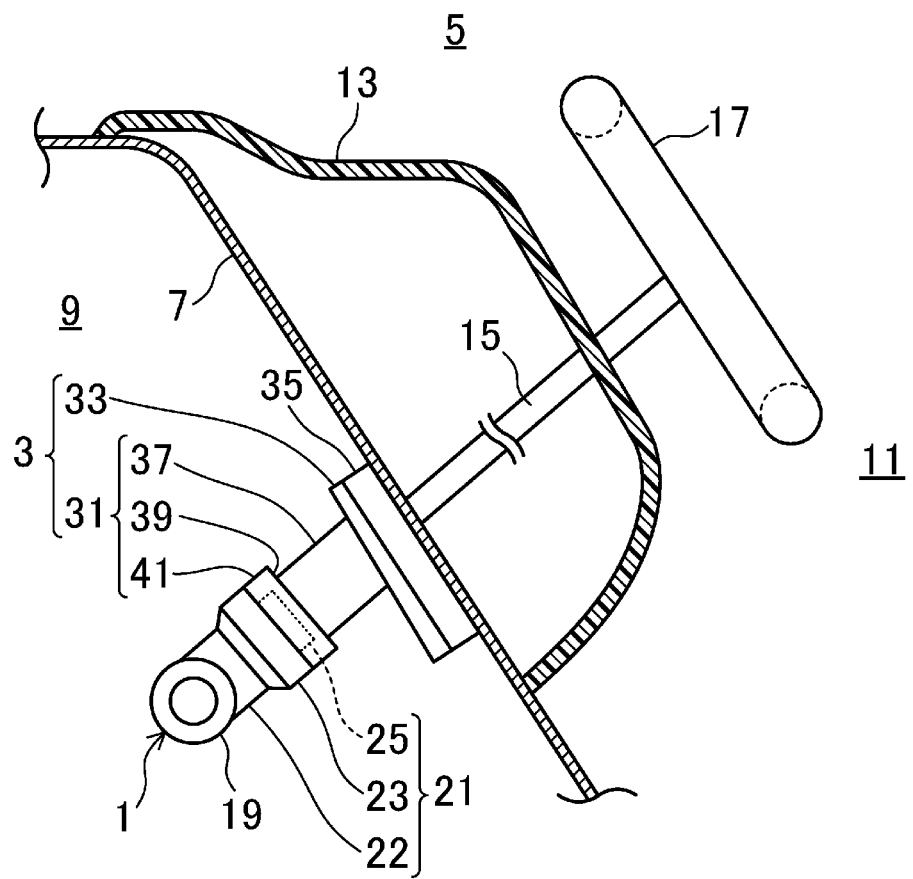
FIG. 1 is a side cross-sectional view of a front part of a vehicle to which a fitting structure of cylindrical members according to the first embodiment is applied.

FIG. 1 is a side cross-sectional view of a front part of an automobile 5 to which a fitting structure of cylindrical members of the present embodiment is applied. The portions to which the cylindrical member fitting structure of the present embodiment is applied are a shaft accommodating part (hereinafter referred to as a first cylindrical member) 21 that is part of a steering gear box 1 and will be described later, and a second cylindrical member 31 that is part of a dust cover 3 and will be described later. In FIG. 1, the reference character 7 refers to a dash panel separating an engine compartment 9 and a cabin 11 from each other; the reference character 13 refers to an instrument panel which is provided at the cabin 11 side of the dash panel 7 and to which instruments are attached; the reference character 15 refers to a steering shaft which passes through the instrument panel 13 and of which a lower end is drive-coupled to the steering gear box 1 provided at the engine compartment 9; and the reference character 17 refers to a steering wheel which steers the automobile 5. The first cylindrical member 21 extends toward the cabin 11. The dust cover 3 is provided on a surface of the dash panel 7 facing the engine compartment 9, with a noise insulation member 35, descried later, interposed therebetween. The first cylindrical member 21 is fitted into the approximately cylindrical, second cylindrical member 31 of the dust cover 3.

Figure 2:
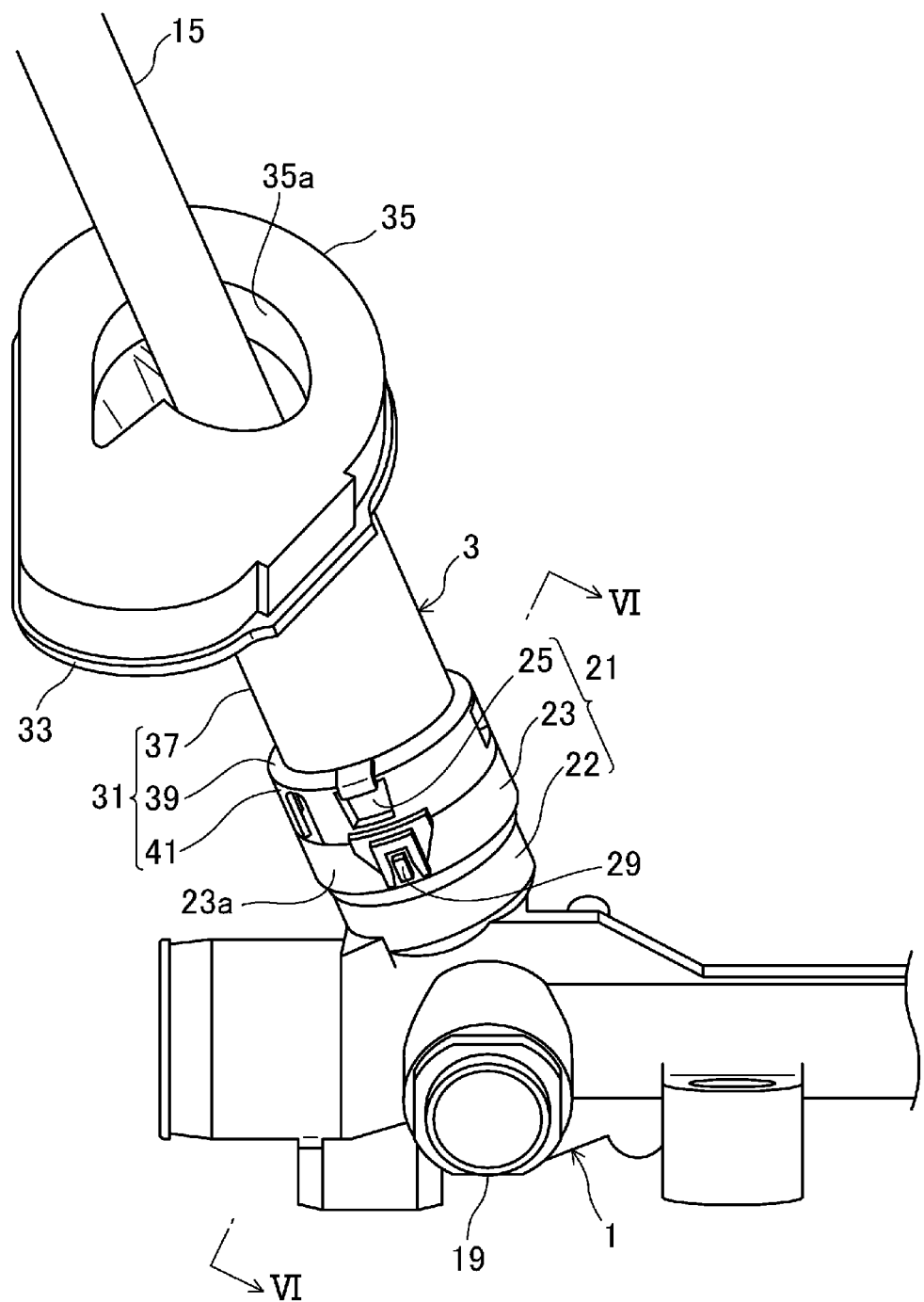
FIG. 2 is a perspective view of a steering gear box and a dust cover fitted to each other.
Figure 3:
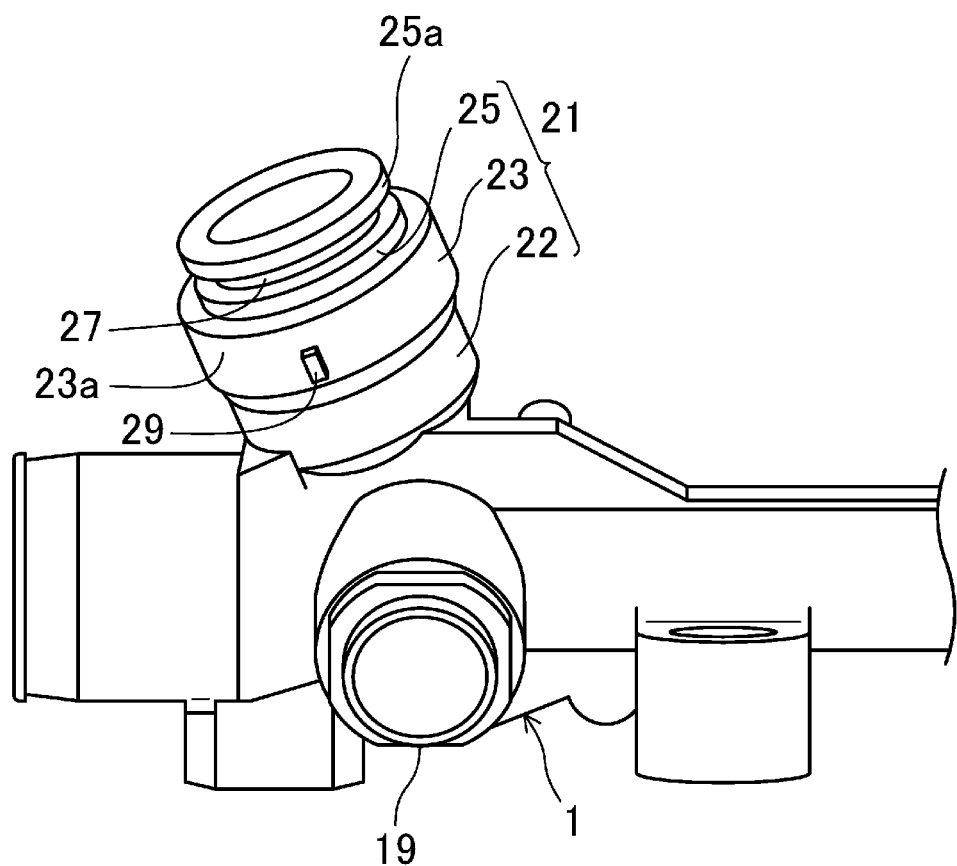
FIG. 3 is a perspective view of the steering gear box.

FIG. 2 is a perspective view showing the first cylindrical member 21, which is part of the steering gear box 1, is fitted into the second cylindrical member 31. FIG. 3 is a perspective view of the steering gear box 1. In FIG. 2, a steering shaft 15 is indicated by virtual line. The steering gear box 1 changes the rotation of the steering shaft 15 into movement in the vehicle's width direction by a rack and pinion or a ball nut mechanism. In the case of the rack and pinion mechanism, the mechanism includes: a housing 19 accommodating a pinion shaft (not shown) which is caused to rotate by rotation of the steering shaft 15 and a rank bar (not shown) which is engaged with the pinion shaft and changes the rotational movement of the steering shaft 15 into a straight-line movement; and a resin-made first cylindrical member 21 which extends toward the cabin 11 from the housing 19 and in which the steering shaft 15 is inserted and accommodated. The first cylindrical member 21 includes a cylindrical insertion body 22 which extends from the housing 19, a first cylindrical member body 23 with an increased diameter from the cabin 11 side end of the insertion body 22, and a first fitting cylinder 25 with a reduced diameter from the cabin 11 side end of the first cylindrical member body 23. An annular recess (an engaged portion) 27 with a rectangular cross-section is formed in the entire outer circumferential surface 25a of the first fitting cylinder 25. A positioning protrusion 29, which determines a location of the second cylindrical member 31 with respect to the first cylindrical member 21 in a circumferential direction when the first cylindrical member 21 and the second cylindrical member 31 are fitted to each other, is formed on the outer circumferential surface 23a of the first cylindrical member body 23.

Figure 4:
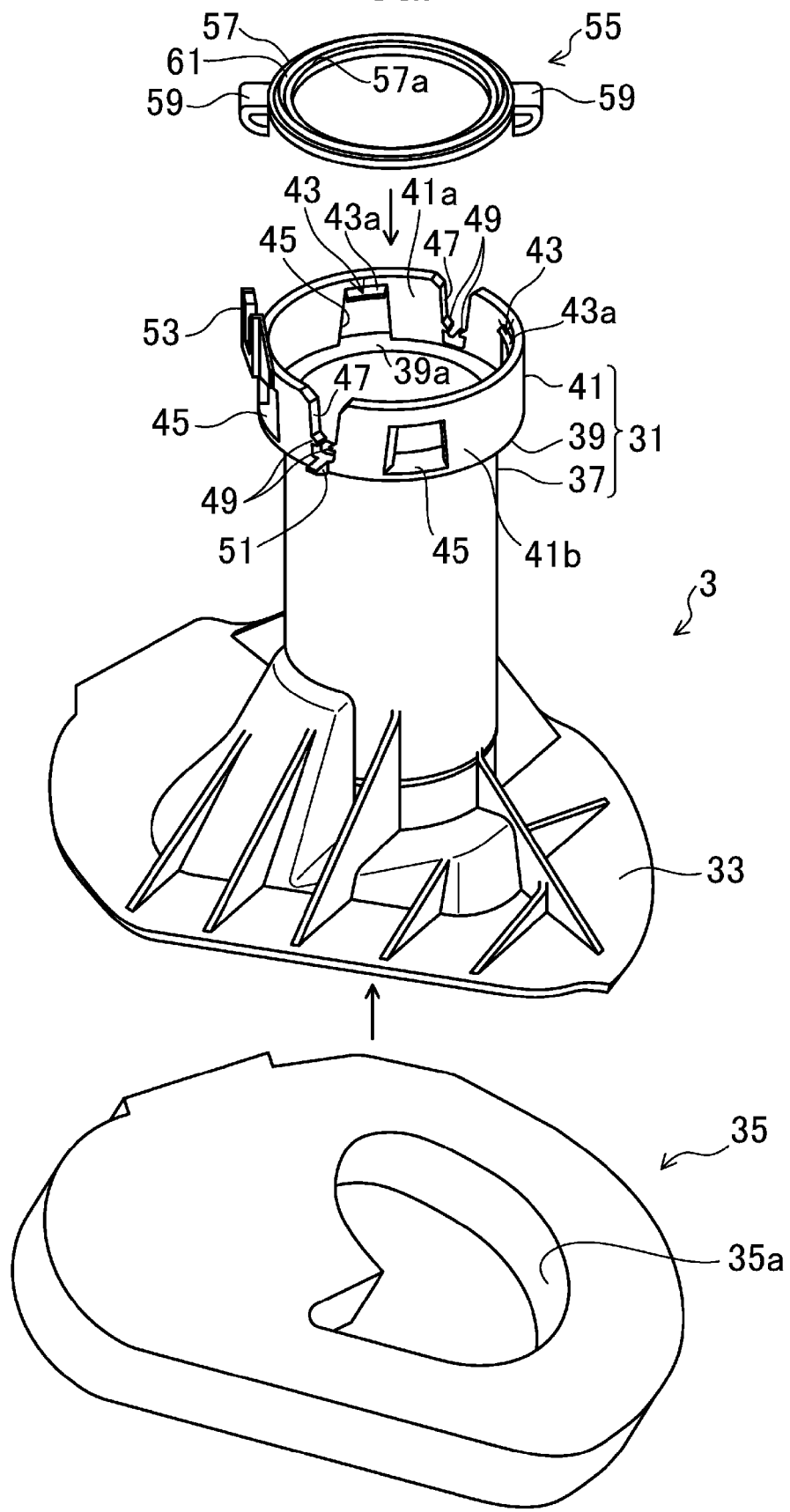
FIG. 4 is an exploded perspective view of the dust cover to which a sealing member and a noise insulation member are attached.
Figure 5:
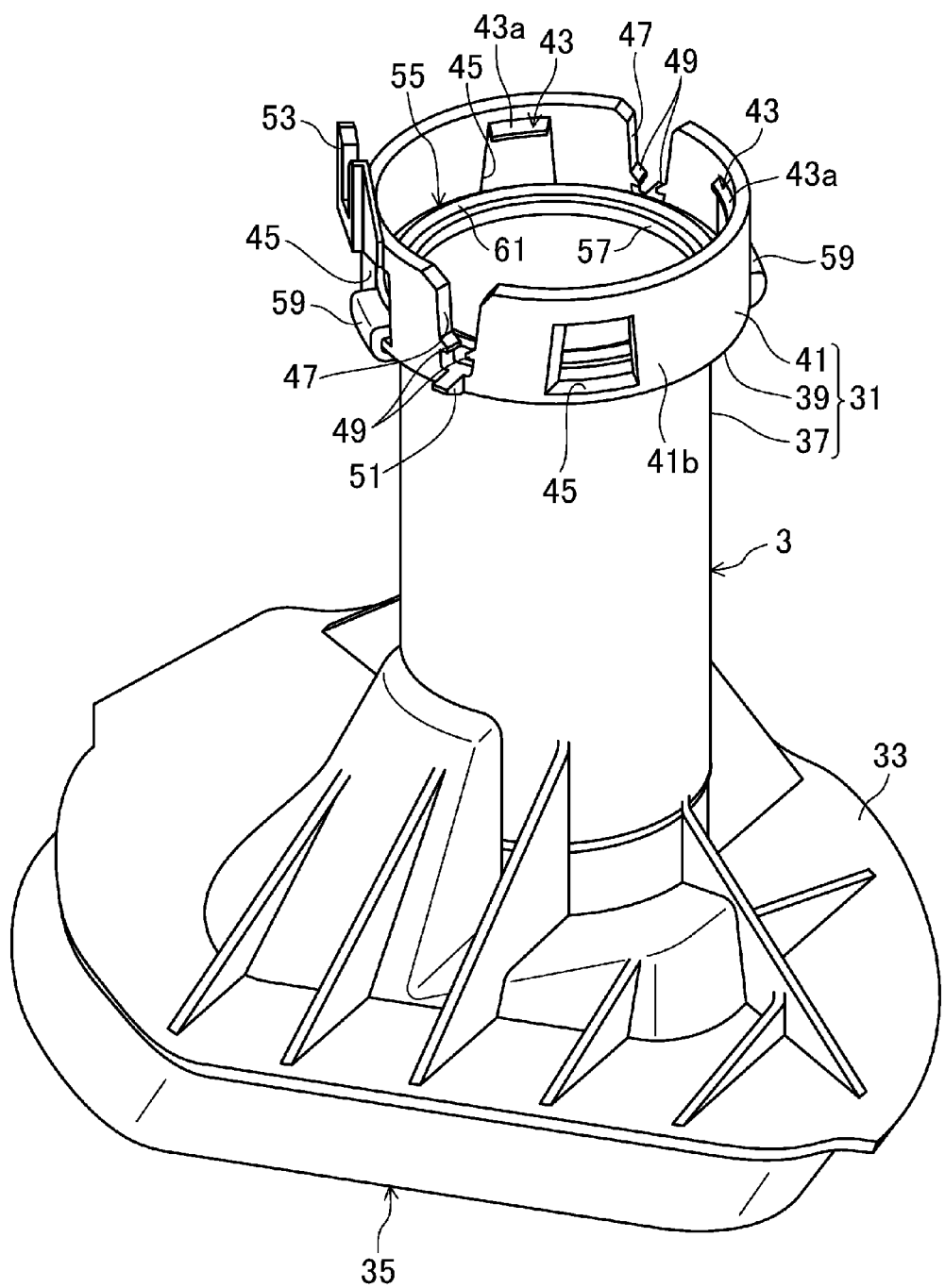
FIG. 5 is a perspective view of the entire dust cover to which the sealing member and the noise insulation member are attached.

FIG. 4 and FIG. 5 show the dust cover 3. For convenience of explanation, the upside and the downside of FIG. 4 and FIG. 5 are referred to as the "upper side" and the "lower side." However, in the state where the dust cover 3 is actually attached to the automobile 5, the upside in FIG. 4 and FIG. 5 faces downward. The dust cover 3 is made of resin, and includes the second cylindrical member 31 in which the steering shaft 15 is inserted, and a flange 33 provided on the cabin 11 side end of the second cylindrical member 31. A sponge-like noise insulation member 35 provided with an insertion hole 35a for insertion of the steering shaft 15 is disposed between the flange 33 and the dash panel 7.

The second cylindrical member 31 will be described in detail with reference to FIG. 4. The second cylindrical member 31 includes a cylindrical insertion body 37 which extends from the flange 33 toward the steering gear box 1 side, an annular flange 39 which protrudes from one end of the insertion body 37 on the steering gear box 1 side in a direction orthogonal to the cylinder's center line, and a cylindrical second fitting cylinder 41 which is formed integrally with the entire protrusion end of the flange 39 and projects in the cylinder's center line direction from the protrusion end. Four protruding portions (engaging portions) 43 are provided on an inner circumferential surface 41a of the second fitting cylinder 41 at 90 degree intervals. Further, the second fitting cylinder 41 is provided with trapezoidal through holes 45 which are open between each of the protruding portions 43 and the flange 39 in the direction orthogonal to the cylinder's center line. An upper surface 43a of each of the protruding portions 43 is tilted downward with a decrease in distance to the cylinder's center line in a direction orthogonal to the cylinder's center line, whereas a lower surface 43b (a surface facing the flange, see FIG. 6) of each of the protruding portions 43 is approximately orthogonal to the cylinder's center line. The upper peripheral end of each of the through holes 45 is continuous with the lower surface 43a of the protruding portion 43 without a step, whereas the lower peripheral end of the through hole 45 is continuous with a sealing member placement surface 39a of the flange 39 without a step. Further, a pair of notches 47 are formed between the through holes 45 at 180 degree intervals. Each of the notches 47 is formed in the second fitting cylinder 41 by cutting out a portion of the second fitting cylinder 41 entirely in its projection direction. Further, a pair of claws 49 are provided to protrude from both of opposing side surfaces of each notch 47. The claw 49 may also be provided at one of the opposing side surfaces of the notch 47. A projection 51 is provided at a portion of the outer periphery of the flange 39 corresponding to the notch 47, and projects outward in the direction orthogonal to the cylinder's center line. Further, a forked portion 53 for positioning is provided at a portion of the outer circumferential surface 41b of the second fitting cylinder 41 corresponding to one of the protruding portions 43, and extends in the protruding direction of the second fitting cylinder 41.

The sealing member 55 includes a rubber-made annular disk 57 placed on the sealing member placement surface 39a of the flange 39, and a pair of fixing portions 59 provided at the outer periphery of the annular disk 57 at 180 degree intervals. A ridge 61 with a triangular cross-section is provided on an entire upper surface 57a of the annular disk 57. Each of the fixing portions 59 is in a U-shape and is flexible, and extends outward from the outer periphery of the annular disk 57 in the direction orthogonal to the cylinder's center line and is bended downward.

Figure 6:
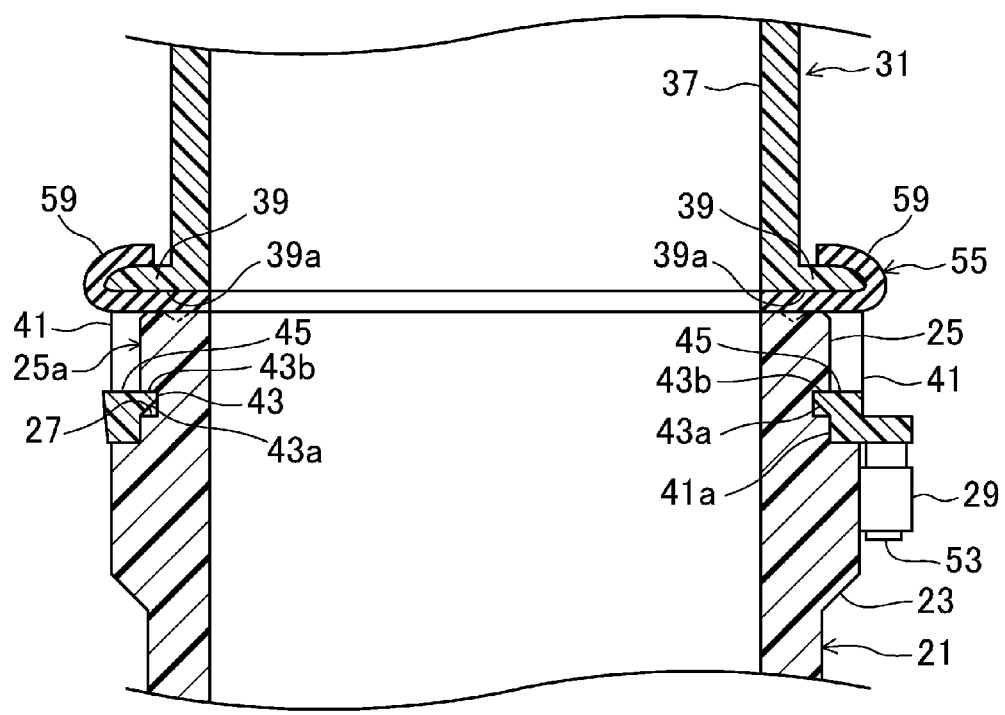
FIG. 6 is a cross-sectional view taken along the line VI-VI of FIG. 2.

FIG. 6 is a cross-sectional view taken along the line VI-VI of FIG. 2, showing a portion where the first cylindrical member 21 and the second cylindrical member 31 are fitted to each other. In the state where the first fitting cylinder 25 is fitted into the second fitting cylinder 41, the protruding portions 43 protruding from the second fitting cylinder 41 are engaged with an annular recess 27 formed in the first fitting cylinder 25. Thus, the first fitting cylinder 25 and the second fitting cylinder 41 are prevented from moving in the cylinder's center line direction. Moreover, the state in which the sealing member 55 is strongly pressed by the end of the first fitting cylinder 25 and the flange 39 is maintained.

In order to fit the first cylindrical member 21 into the second cylindrical member 31, the sealing member 55 is first attached to the second cylindrical member 31. Specifically, the sealing member 55 is accommodated in the second fitting cylinder 41, with the ridge 61 facing up. The fixing portions 59 are inserted in the through holes 45 from inside so that the bent portions of the fixing portions 59 are engaged with the outer periphery of the flange 39, thereby placing the sealing member 55 on the sealing member placement surface 39a. Next, the forked portion 53 of the second cylindrical member 31 is aligned with the positioning protrusion 29 of the first cylindrical member 21, and the second cylindrical member 31 is pressed into the first cylindrical member 21. Here, when the upper surfaces 43a of the protruding portions 43 of the second fitting cylinder 41 come in contact with the end of the first fitting cylinder 25, the resin-made second fitting cylinder 41 is opened in the direction orthogonal to the cylinder's center line, and the protruding portions 43 ride on the outer circumferential surface 25a of the first fitting cylinder 25. When the pressing continues and the protruding portions 43 reach the annular recess 27 formed in the outer circumferential surface 25a, the protruding portions 43 are fitted in the annular recess 27, and the first fitting cylinder 25 and the second fitting cylinder 41 are engaged with each other by a protrusion-recess fitting. Thus, the movement of the first fitting cylinder 25 and the second fitting cylinder 41 in the direction of the cylinder's center line is limited. Further, the sealing member 55 is strongly pressed by the first fitting cylinder 25 and the flange 39, and that state is maintained.

Since the movement of the first fitting cylinder 25 and the second fitting cylinder 41 in the direction of the cylinder's center line is limited as described above, the second cylindrical member 31 is prevented from being detached from the first cylindrical member 21 even when the second cylindrical member 31 and the first cylindrical member 21 are oscillated. Further, the sealing member 55 is strongly pressed by the first fitting cylinder 25 and the flange 39 in the state where the first fitting cylinder 25 and the second fitting cylinder 41 are engaged with each other. Thus, sufficient sealing can be ensured. Moreover, the contact area is small because the first fitting cylinder 25 makes a linear contact with the ridge 61 of the sealing member 55, which increases the pressure onto the ridge 61 and further improves sealing. Furthermore, fitting the cylindrical members 21, 31 to each other does not require time and effort because the cylindrical members 21, 31 can be fitted to each other by simply fitting the first fitting cylinder 25 into the second fitting cylinder 41, with the sealing member 55 attached to the flange 39 of the second cylindrical member 31.

Further, due to the protruding portions 43 which protrude from the inner circumferential surface 41a of the second fitting cylinder 41, the flange 39 and the second fitting cylinder 41 form an undercut. Thus, molding dies for the dust cover 3 need to include a slide die for molding the protruding portions 43. In the case where the second fitting cylinder 41 has a relatively small diameter, the slide die needs to be slid at a location outside the second fitting cylinder 41. In this case, the through hole 45 is inevitably formed between the flange 39 and the protruding portion 43. The fixing portions 59 are thus provided at the outer periphery of the sealing member 55, and the fixing portions 59 are inserted in the through holes 45 to be engaged with the outer periphery of the flange 39. As a result, the sealing member 55 placed on the sealing member placement surface 39a is prevented from falling off the flange 39.

Further, the notches 47 formed in the second fitting cylinder 41 allow the second fitting cylinder 41 to be easily opened, which leads to easier fitting process. Particularly when the second fitting cylinder 41 has a relatively small diameter and is not easily opened, the notches 47 help the second fitting cylinder 41 to be easily opened. This means that the notches 47 are effective particularly in the case where the second fitting cylinder 41 has a relatively small diameter.

The annular recess 27 is formed in the entire outer circumferential surface 25a of the first fitting cylinder 25, but is not limited to this configuration, and may be separately formed at locations corresponding to the protruding portions 43 on the second fitting cylinder 41, for example. Further, four protruding portions 43 are provided on the inner circumferential surface 41a of the second fitting cylinder 41 at 90 degree intervals, but are not limited to this configuration. For example, a pair of protruding portions 43 may be provided at 180 degree intervals, or three or five or more protruding portions 43 may be provided such that adjacent protruding portions 43 are at 180 degree or less intervals.

(First Variation of First Embodiment)

Figure 7:
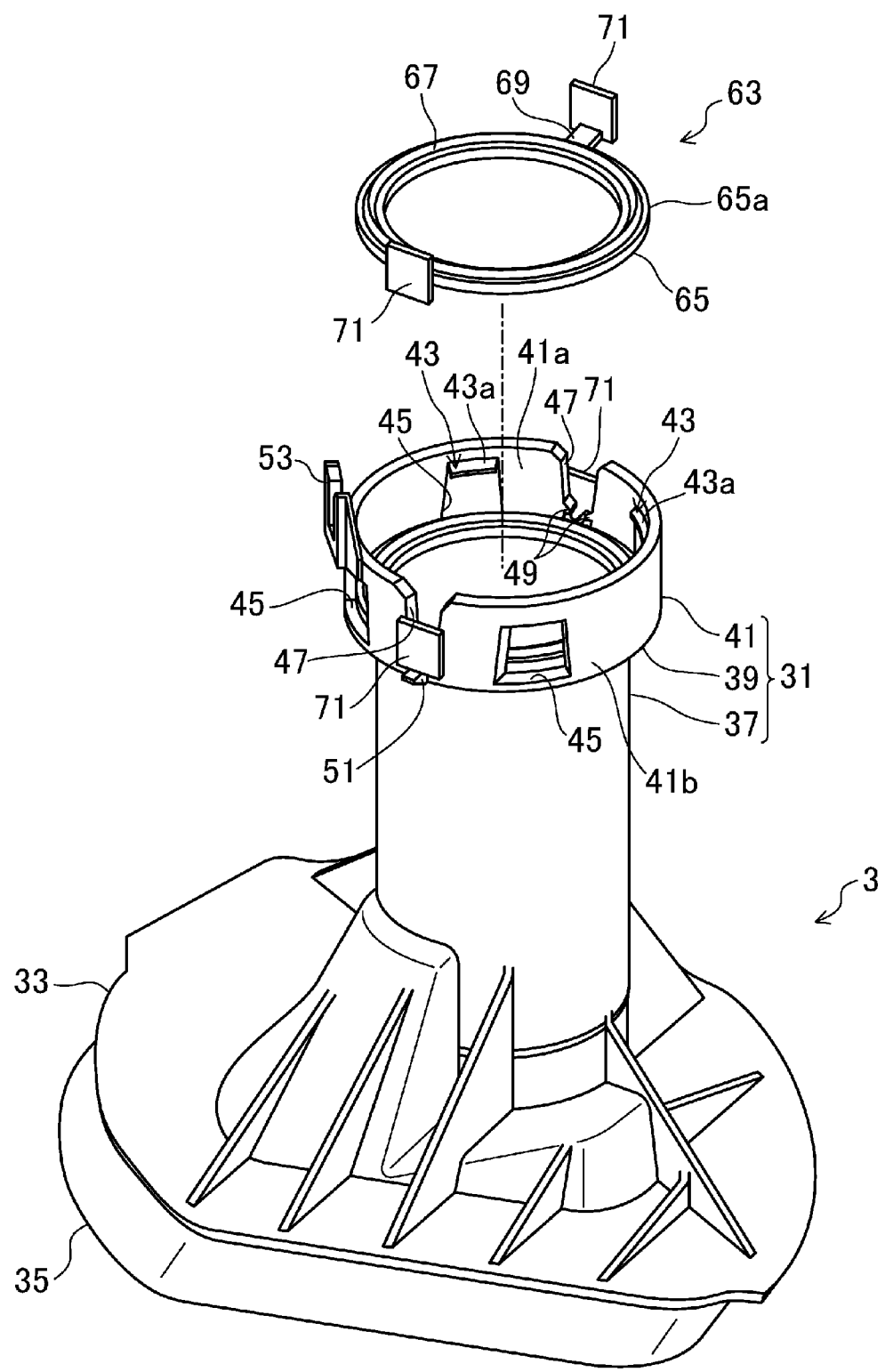
FIG. 7 shows a dust cover of the first variation of the first embodiment, corresponding to FIG. 5.

In the first embodiment, the sealing member 55 is attached by utilizing the through holes 45 formed in the second fitting cylinder 41, but the notches 47 formed in the second fitting cylinder 41 may also be utilized. FIG. 7 is a perspective view of the entire dust cover 3 to which a sealing member 63 of the present variation is attached. The configurations except the sealing member 63 are the same as those in the first embodiment. Like reference characters have been used to designate the same elements, and explanation thereof is omitted. For the convenience of explanation, the upside and the downside of FIG. 7 are referred to as the "upper side" and the "lower side." However, in the state where the dust cover 3 is actually attached to the automobile 5, the upside in FIG. 7 faces downward. The sealing member 63 includes an annular disk 65 with a ridge 67 formed on its entire upper surface 65a, a pair of extended portions 69 provided on the outer periphery of the annular disk 65 at 180 degree intervals, and a rectangular contact plate 71 which extends upward from one end of each of the extended portions 69. In attaching the sealing member 63 to the second cylindrical member 31, the extended portions 69 are inserted from the open ends of the notches 47, with the ridge 67 facing up, and the extended portions 69 are pushed down to pass through between the claws 49 of the respective notches 47 and be accommodated at the bottom of the notches 47. In this state, the claws 49 push the extended portions 69 against the flange 39, thereby limiting up-and-down movement of the extended portions 69. It is therefore possible to prevent the sealing member 63 from falling off the second cylindrical member 31.

The sealing member 63 can be easily attached to the second cylindrical member 31 since the sealing member 63 is attached by simply inserting the extended portions 69 from the open ends of the notches 47 and pushing them down as described above. In addition, the projections 51 are provided at the outer periphery of the flange 39 at locations corresponding to the notches 47. Thus, even if the ridge 67 faces down in attaching the sealing member 63, the extended portions 69 cannot go down any further because the contact plates 71 come in contact with the projections 51. It is therefore possible to prevent the sealing member 63 from being attached in the wrong orientation.

(Second Variation of First Embodiment)

In the first embodiment, the sealing member 55 placed on the sealing member placement surface 39a is prevented from falling off by engaging the fixing portions 59 of the sealing member 55 with the outer periphery of the flange 39. However, the sealing member 55 may fall off if the engagement of the fixing portions 59 is not sufficient. The sealing member can be reliably prevented from falling off by improvement in shape of the through hole.

Figure 8:
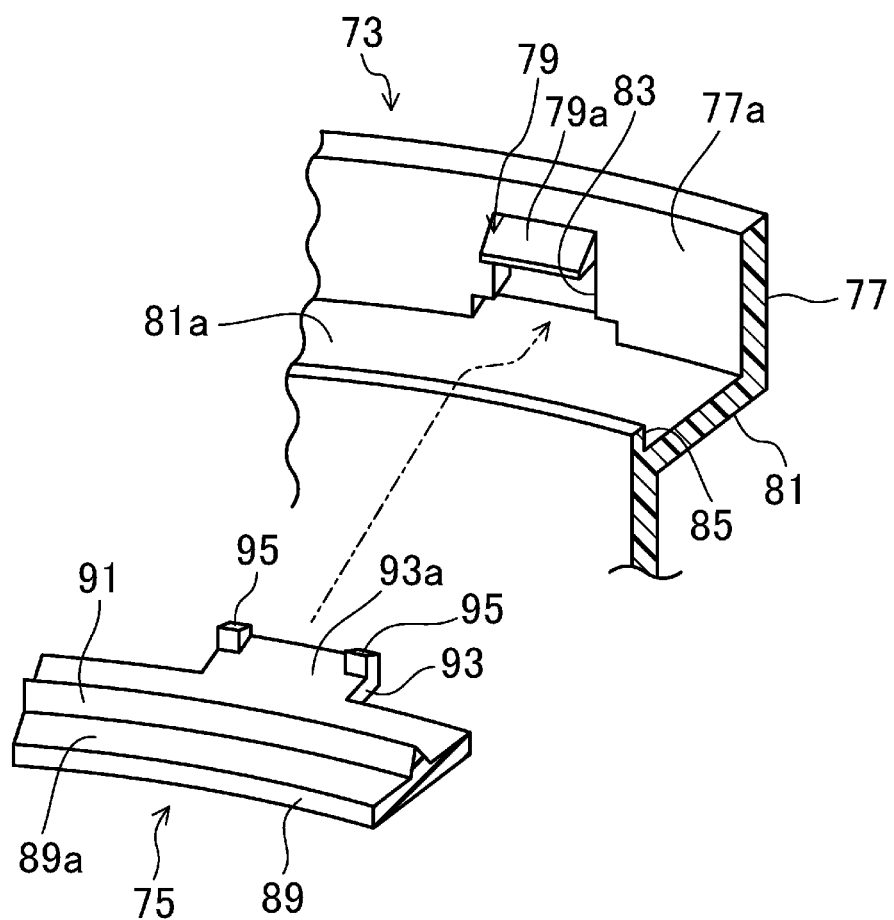
FIG. 8 is a partial perspective view of a dust cover and a sealing member of the second variation of the first embodiment.

FIG. 8 shows a second cylindrical member 73 and a sealing member 75 of the present variation. The configurations expect the second cylindrical member 73 and the sealing member 75 are the same as those in the first embodiment. Like reference characters have been used to designate the same elements, and explanation thereof is omitted. For the convenience of explanation, the upside and the downside of FIG. 8 are referred to as the "upper side" and the "lower side." However, in the state where the dust cover 3 is actually attached to the automobile 5, the upside in FIG. 8 faces downward. The second cylindrical member 73 includes a second fitting cylinder 77 that is provided with a protruding portion 79 on its inner circumferential surface 77a. A through hole 83 is formed at a location between the protruding portion 79 and a flange 81. An upper surface 79a of the protruding portion 79 is tilted downward with a decrease in distance to the cylinder's center line in a direction orthogonal to the cylinder's center line. The through hole 83 is wider in the circumferential direction at its lower part than its upper part. Further, an inner peripheral side wall 85 protruding upward is formed at the entire inner periphery of the flange 81. On the other hand, the sealing member 75 includes an annular disk 89 with a ridge 91 having a triangular cross-section on its entire upper surface 89a. A projection 93 is formed so as to project outward from the outer periphery of the annular disk 89 in the direction orthogonal to the cylinder's center line. The width of the projection 93 in the circumferential direction is approximately the same as the width of the lower part of the through hole 83, and the projection 93 is provided with engagement claws 95 at both ends of its upper surface 93a in the circumferential direction.

In attaching the sealing member 75 to the second cylindrical member 73, the sealing member 75 is held with the ridge 91 facing up as shown in FIG. 8, and the projection 93 is pushed into the through hole 83. Since being made of rubber, the projection 93 is compressed in a vertical direction while being inserted in the through hole 83. After passing through the through hole 83, the engagement claws 95 return to their original shapes, and engage with the upper peripheral end of the through hole 83. It is therefore possible to prevent the sealing member 75 from falling off.

The peripheral side wall 85 may not be provided in the case where the engagement claws 95 are provided. The engagement claws 95 may not be provided in the case where the inner peripheral side wall 85 is provided.

(Second Embodiment)

In the first embodiment, the sealing member 55, 75 is attached by utilizing the through hole 45, 83 formed for the purpose of molding the protruding portions 43, 79, or the sealing member 63 is attached by utilizing the notch 47 formed for the purpose of allowing the second fitting cylinder 41 to be easily opened at fitting. However, the attachment is not limited to these techniques, and the sealing member can be attached to the flange by various methods.

Figure 9A:
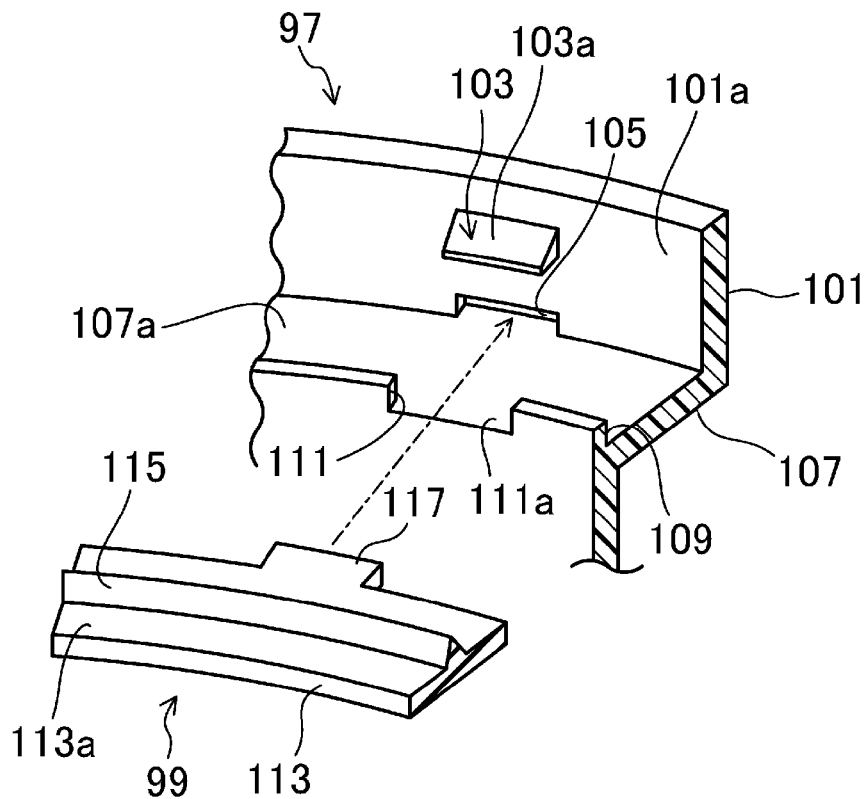
FIG. 9A is a partial perspective view of a dust cover and a sealing member of the second embodiment.

FIG. 9A is a partial perspective view of a second cylindrical member 97 and a sealing member 99 of the present embodiment. The configurations except the second cylindrical member 97 and the sealing member 99 are the same as those in the first embodiment. Like reference characters have been used to designate the same elements, and explanation thereof is omitted. For the convenience of explanation, the upside and the downside of FIG. 9A are referred to as the "upper side" and the "lower side." However, in the state where the dust cover 3 is actually attached to the automobile 5, the upside in FIG. 9A faces downward. The second cylindrical member 97 includes a second fitting cylinder 101 with a protruding portion 103 provided on the inner circumferential surface 101a. An accommodation recess 105 is formed in the inner circumferential surface 101a under the protruding portions 103, and is open on the inner circumferential surface 101a. The accommodation recess 105 is in a rectangular shape when viewed from the direction orthogonal to the cylinder's center line. Further, an inner peripheral side wall 109 protruding upward is provided at the inner periphery of a sealing member placement surface 107a of a flange 107. A rectangular notch 111 is formed in the inner peripheral side wall 109 at a portion facing the accommodation recess 105 by cutting out the portion entirely in the protruding direction of the inner peripheral side wall 109. A lower end periphery 111a of the notch 111 is continuous with the sealing member placement surface 107a of the flange 107 without a step. On the other hand, the sealing member 99 includes an annular disk 113 with a ridge 115 having a triangular cross-section on its entire upper surface 113a. A projection 117 is formed so as to project outward from the outer periphery of the annular disk 113 in the direction orthogonal to the cylinder's center line.

In attaching the sealing member 99 to the flange 107, the sealing member 99 is held with the ridge 115 facing up as shown in FIG. 9A, and the projection 117 is pushed into the accommodation recess 105, thereby placing the annular disk 113 on the sealing member placement surface 107a between the inner peripheral side wall 109 and the second fitting cylinder 101. The sealing member 99 is attached to the flange 107 in this manner. The upper and lower surfaces of the projection 117 are in contact with the upper and lower surfaces of the accommodation recess 105 in the state where the sealing member 99 is attached to the flange 107. Thus, the up-and-down movement of the sealing member 99 is limited. It is therefore possible to prevent the sealing member 99 from falling off the second cylindrical member 97.

Further, since the movement of the annular disk 113 in the direction orthogonal to the cylinder's center line is limited due to the second fitting cylinder 101 and the inner peripheral side wall 109, the projection 117 is not easily pulled out from the accommodation recess 105, and it is therefore possible to reliably prevent the attached sealing member 99 from falling off the second cylindrical member 97.

In the case where the second cylindrical member 97 has a relatively large diameter, a slide die can be located inside the second cylindrical member 97 and be slid in the direction orthogonal to the cylinder's center line to form the accommodation recess 105. The notch 111 is provided to allow the slide die to slide inside the second cylindrical member 97. This means that a through hole passing through the second fitting cylinder 101 in the direction orthogonal to the cylinder's center line is not formed, and therefore that entry of dust or the like can be reliably prevented.

(Third Embodiment)

In the first and second embodiments, the sealing member 55, 63, 75, 99 is provided with the fixing portions 59, the extended portions 69, the projection 93, and the projection 117, respectively. However, it is possible to firmly attach the sealing member to the second cylindrical member without the fixing portions 59, the extended portions 69, the projection 93, and the projection 117 by improving the structure of the second cylindrical member.

Figure 9B:
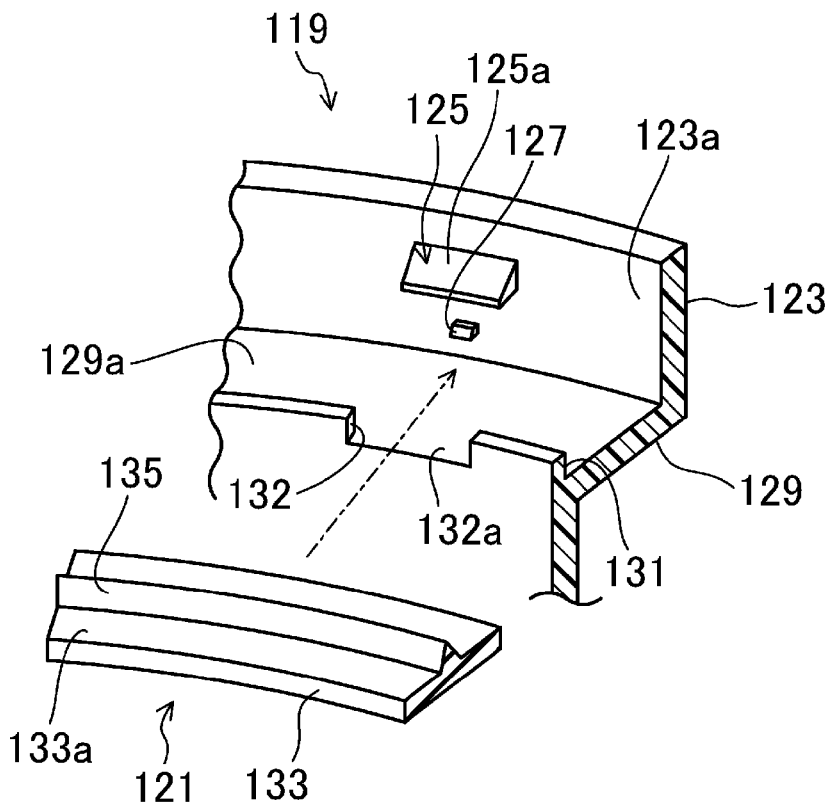
FIG. 9B is a partial perspective view of a dust cover and a sealing member of the third embodiment.

FIG. 9B is a partial perspective view of a second cylindrical member 119 and a sealing member 121 of the present embodiment. The configurations except the second cylindrical member 119 and the sealing member 121 are the same as those in the first embodiment. Like reference characters have been used to designate the same elements, and explanation thereof is omitted. For the convenience of explanation, the upside and the downside of FIG. 9B are referred to as the "upper side" and the "lower side." However, in the state where the dust cover 3 is actually attached to the automobile 5, the upside in FIG. 9B faces downward. The second cylindrical member 119 includes a second fitting cylinder 123 having a protruding portion 125 on its inner circumferential surface 123a. A raised portion 127 is provided under the protruding portion 125 to protrude from the inner circumferential surface 123a. The raised portion 127 may be provided at other locations than the location under the protruding portion 125. In the case where the raised portion 127 is provided under the protruding portion 125, the raised portion 127 and the protruding portion 125 can be formed with a single slide die. It is therefore possible to reduce time and effort in forming the raised portion 127 and the protruding portion 125. Further, an inner peripheral side wall 131 protruding upward is formed at the inner periphery of the flange 129. A notch 132 is formed in the inner peripheral side wall 131 at a portion facing the protruding portion 125 and the raised portion 127. The notch 132 is formed in the inner peripheral side wall 131 by cutting out the portion entirely in the protruding direction of the inner peripheral side wall 131. A lower end periphery 132a of the notch 132 is continuous with the sealing member placement surface 129a of the flange 129 without a step. On the other hand, the sealing member 121 is comprised of an annular disk 133 with a ridge 135 on its entire upper surface 133a.

When the sealing member 121 is placed on the sealing member placement surface 129a of the flange 129, the outer periphery of the upper surface 133a of the sealing member 121 is pressed onto the sealing member placement surface 129a by the raised portion 127, thereby limiting the up-and-down movement of the sealing member 121. It is therefore possible to prevent the sealing member 121 from falling off the second cylindrical member 119. Further, since the movement of the sealing member 121 in the direction orthogonal to the cylinder's center line is limited due to the inner peripheral side wall 131, and the outer periphery of the sealing member 121 is pressed against the raised portion 127, the movement of the sealing member 121 in the vertical direction is more reliably limited. This means that nothing needs to be provided at the outer periphery of the annular disk 133, and the structure of the sealing member 121 can be therefore simplified.

(Other Embodiments)

In the above embodiments, the recess 27 is formed in the first cylindrical member 21, and the protruding portions 43, 79, 103, 125 are provided at the second cylindrical members 31, 73, 97, 119. These protruding portions 43, 79, 103, 125 and the recess 27 are engaged with each other by a protrusion-recess fitting, thereby engaging the first cylindrical member 21 and the second cylindrical members 31, 73, 97, 119 with each other. However, the configuration is not limited to this, and the first cylindrical member may be provided with a protruding portion and the second cylindrical member may be provided with a recess.

It is preferable that the flanges 39, 81, 107, 129 protrude in the direction orthogonal to the cylinder's center line as in the above embodiments, but the flanges 39, 81, 107, 129 may protrude in the direction approximately orthogonal to the cylinder's center line, with an inclination of 75 to 105 degrees with respect to the cylinder's center line, or may protrude such that the flanges 39, 81, 107, 129 intersect with the cylinder's center line with a slight inclination with respect to the cylinder's center line.

As described above, a fitting structure of cylindrical members according to the present disclosure is applicable in preventing cylindrical members from being detached from each other due to oscillation or the like, while maintaining sealing.

What is claimed is:

1. A fitting structure of cylindrical members, comprising:
a first cylindrical member having a first fitting cylinder at one end thereof;
a second cylindrical member having, at one end thereof, an annular flange which protrudes in a direction intersecting a cylinder's center line, and a second fitting cylinder which projects from an entire protrusion end of the flange in a direction of the cylinder's center line and into which the first fitting cylinder is fitted; and
a sealing member accommodated in the second fitting cylinder and placed on the flange, the sealing member being pressed by an end of the first fitting cylinder and the flange in a state where the first fitting cylinder is fitted in the second fitting cylinder, wherein
at least two engaging portions are formed on one of the first fitting cylinder or the second fitting cylinder, and an engaged portion with which the engaging portions engage is formed in the other,
each of the engaging portions engages with the engaged portion in the state where the first fitting cylinder is fitted in the second fitting cylinder, thereby limiting movement of the first fitting cylinder and the second fitting cylinder in the direction of the cylinder's center line, and maintaining the state where the sealing member is pressed by the end of the first fitting cylinder and the flange,
the engaging portions are protruding portion which protrude from an inner circumferential surface of the second fitting cylinder,
the engaging portion is a recess which corresponds to the protruding portions and is formed in an outer circumferential surface of the first fitting cylinder,
the second fitting cylinder is provided with a through hole that is located between each of the protruding portions and the flange and penetrates the second fitting cylinder in the direction intersecting the cylinder's center line, a periphery of the through hole is continuous with a surface of a corresponding one of the protruding portions facing the flange and a sealing member placement surface of the flange without a step, the sealing member includes a fixing portion extending outward from an outer periphery of the sealing member, and when the sealing member is placed on the flange, the fixing portion is inserted in the through hole and is engaged with an outer periphery of the flange.

2. The fitting structure of claim 1, wherein the second fitting cylinder is provided with a notch obtained by cutting out a portion of the second fitting cylinder entirely in a projection direction of the second fitting cylinder, a claw is provided to protrude from at least one of opposing side surfaces of the notch, the sealing member includes an extended portion extending outward from an outer periphery of the sealing member, and the extended portion is pressed onto the sealing member placement surface of the flange by the claws.

3. The fitting structure of claim 2, wherein the first cylindrical member is part of a steering gear box of a vehicle, the second cylindrical member is part of a dust cover disposed in a dash panel which separates an engine compartment and a cabin from each other, and a steering shaft is inserted in the first cylindrical member and the second cylindrical member.

4. The fitting structure of claim 1, wherein the first cylindrical member is part of a steering gear box of a vehicle, the second cylindrical member is part of a dust cover disposed in a dash panel which separates an engine compartment and a cabin from each other, and a steering shaft is inserted in the first cylindrical member and the second cylindrical member.

5. A fitting structure of cylindrical members, comprising:

a first cylindrical member having a first fitting cylinder at one end thereof;

a second cylindrical member having, at one end thereof, an annular flange which protrudes in a direction intersecting a cylinder's center line, and a second fitting cylinder which projects from an entire protrusion end of the flange in a direction of the cylinder's center line and into which the first fitting cylinder is fitted; and a sealing member accommodated in the second fitting cylinder and placed on the flange, the sealing member being pressed by an end of the first fitting cylinder and the flange in a state where the first fitting cylinder is fitted in the second fitting cylinder, wherein at least two engaging portions are formed on one of the first fitting cylinder or the second fitting cylinder, and an engaged portion with which the engaging portions engage is formed in the other, each of the engaging portions engages with the engaged portion in the state where the first fitting cylinder is fitted in the second fitting cylinder, thereby limiting movement of the first fitting cylinder and the second fitting cylinder in the direction of the cylinder's center line, and maintaining the state where the sealing member is pressed by the end of the first fitting cylinder and the flange, the second fitting cylinder is provided with a notch obtained by cutting out a portion of the second fitting cylinder entirely in a projection direction of the second fitting cylinder, a claw is provided to protrude from at least one of opposing side surfaces of the notch, the sealing member includes an extended portion extending outward from an outer periphery of the sealing member, and the extended portion is pressed onto the sealing member placement surface of the flange by the claws.

6. The fitting structure of claim 5, wherein the first cylindrical member is part of a steering gear box of a vehicle, the second cylindrical member is part of a dust cover disposed in a dash panel which separates an engine compartment and a cabin from each other, and a steering shaft is inserted in the first cylindrical member and the second cylindrical member.

* * * * *